United States Patent [19]
Lawson et al.

[11] Patent Number: 5,703,727
[45] Date of Patent: Dec. 30, 1997

[54] ZOOM LENS AND MAGNIFIER UTILIZING THE SAME

[75] Inventors: John A. Lawson, Pebble Beach; W. Andrew Morrison, Saratoga; Rob E. Savoie, Los Altos Hills, all of Calif.

[73] Assignee: Telesensory Corporation, Mountain View, Calif.

[21] Appl. No.: 279,059

[22] Filed: Jul. 22, 1994

[51] Int. Cl.$^6$ .............................. G02B 27/02; G02B 15/14
[52] U.S. Cl. .......................... 359/802; 359/676; 359/689; 359/698
[58] Field of Search ........................ 359/698, 676, 359/689, 802

[56] References Cited

U.S. PATENT DOCUMENTS

| | | | |
|---|---|---|---|
| 696,788 | 4/1902 | Allen | 359/689 |
| 2,997,919 | 8/1961 | Peck | 359/689 |
| 3,924,934 | 12/1975 | Grey | 359/686 |
| 3,994,572 | 11/1976 | Uesugi et al. | 359/689 |
| 4,159,165 | 6/1979 | Betensky et al. | 359/681 |
| 4,304,466 | 12/1981 | Betensky | 359/682 |
| 4,586,793 | 5/1986 | Tanaka et al. | 359/680 |
| 4,770,509 | 9/1988 | Hayashi et al. | 359/682 |
| 4,802,717 | 2/1989 | Kebo | 359/683 |
| 4,828,372 | 5/1989 | Betensky et al. | 359/689 |
| 4,838,666 | 6/1989 | Shiraishi | 359/689 |
| 5,009,491 | 4/1991 | Hata | 359/689 |
| 5,015,077 | 5/1991 | Ueda | 359/680 |
| 5,140,467 | 8/1992 | Hotta et al. | 359/696 |
| 5,157,550 | 10/1992 | Tsuchiba et al. | 359/689 |
| 5,245,475 | 9/1993 | Tagasugi | 359/689 |
| 5,262,897 | 11/1993 | Kawamura | 359/689 |
| 5,278,698 | 1/1994 | Iizuka et al. | 359/682 |
| 5,418,648 | 5/1995 | Ono | 359/689 |

FOREIGN PATENT DOCUMENTS 440397  9/1934  United Kingdom .

Primary Examiner—David C. Nelms
Assistant Examiner—Jordan M. Schwartz
Attorney, Agent, or Firm—Flehr, Hobach, Test, Albritton & Herbert LLP

[57] ABSTRACT

A zoom lens is described which is quite simple and yet provides a wide (5:1) zoom range. The lens consists of a front focusing negative lens which provides a stationary virtual image for two rear zooming lens groups. These two zooming groups are positive and reimage the object at a camera pickup device. Such zooming groups are of substantially equal focal length and bear equally in the magnification change. The invention includes a magnifier which utilizes the zoom lens and has the mechanical aspects necessary to provide the needed lens motions.

7 Claims, 12 Drawing Sheets

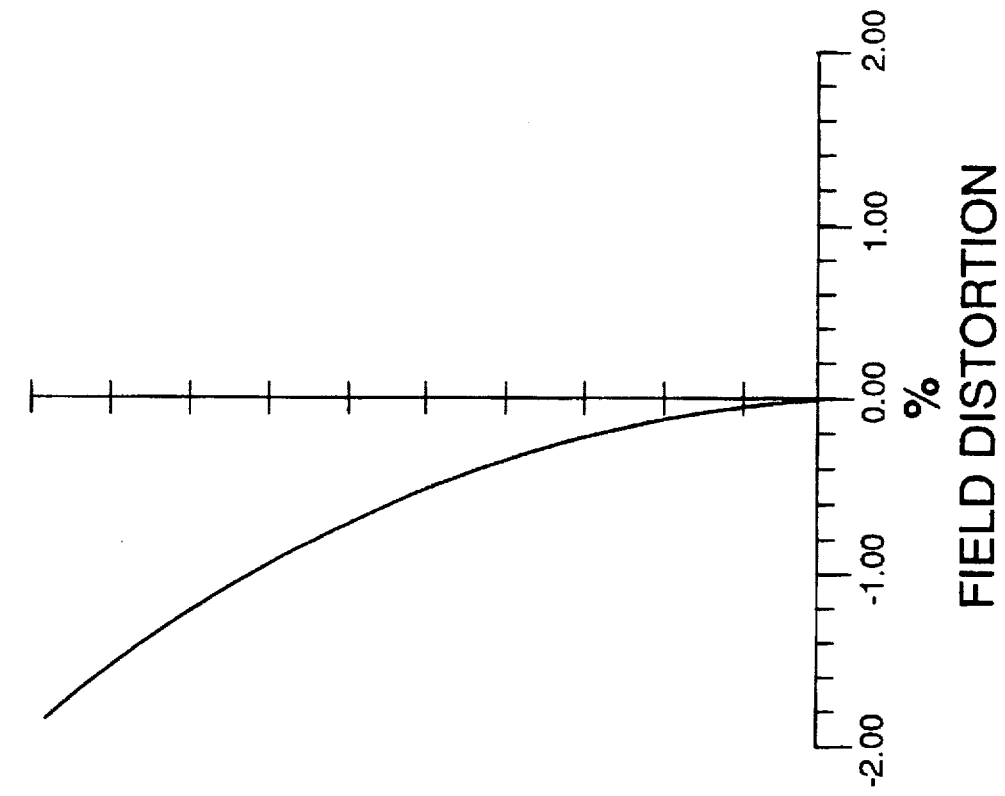
FIG. 5B FIELD DISTORTION
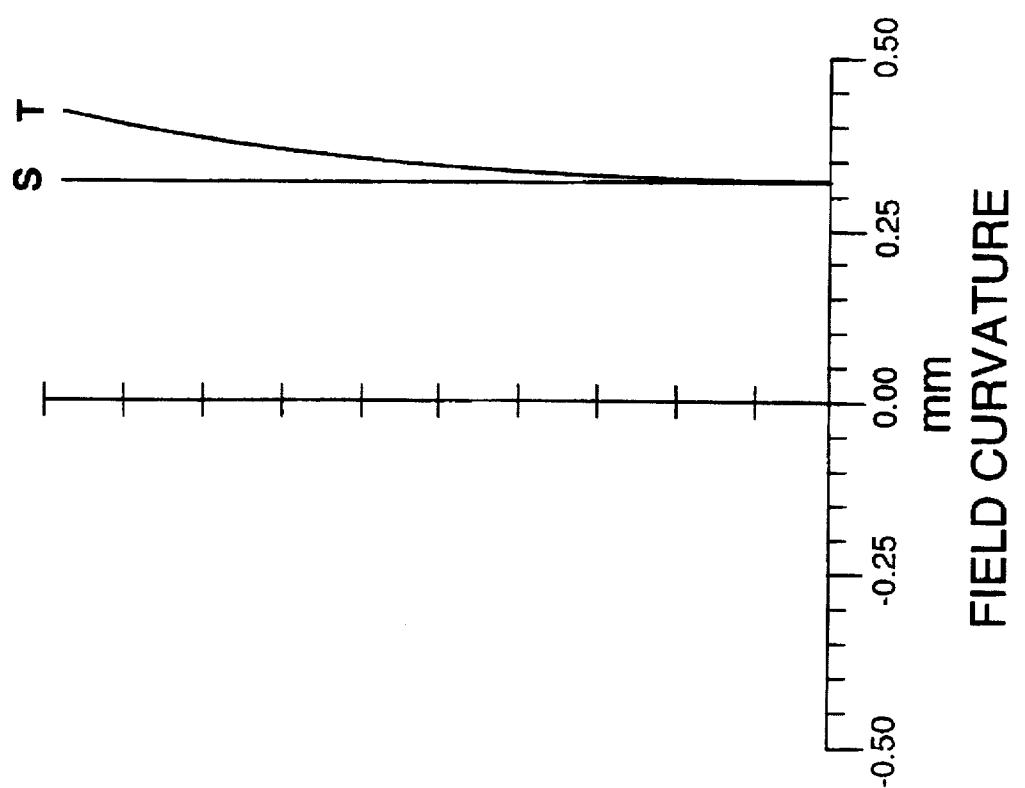
FIG. 5A FIELD CURVATURE

TRANSVERSE RAY FAN PLOT

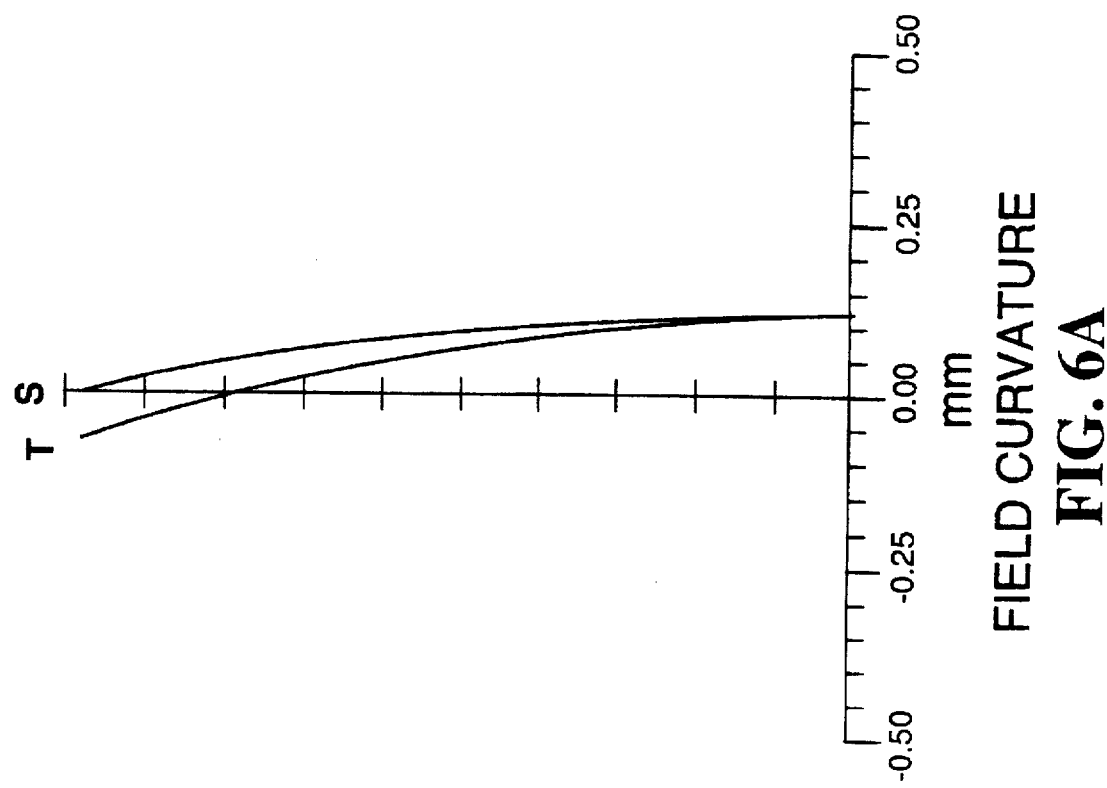
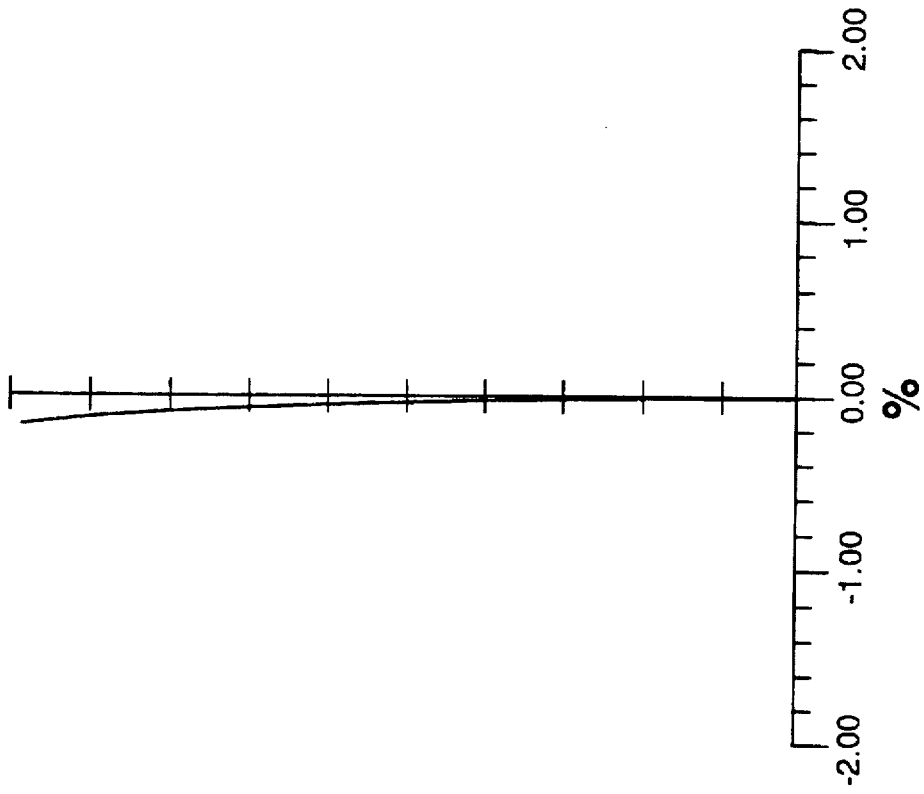

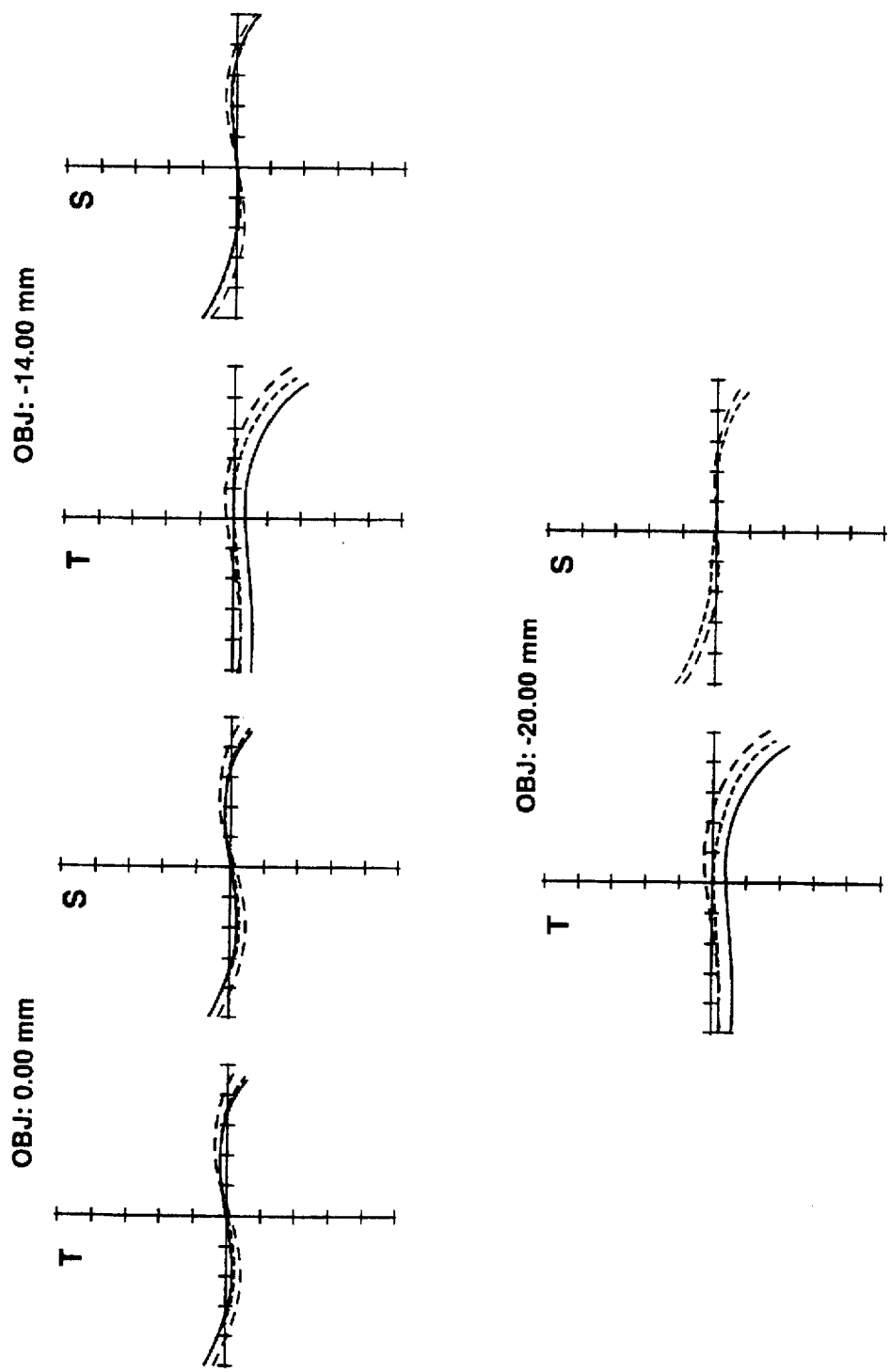

FIELD DISTORTION

FIELD CURVATURE

TRANSVERSE RAY FAN PLOT

5,703,727

ZOOM LENS AND MAGNIFIER UTILIZING THE SAME

BACKGROUND OF THE INVENTION

The present invention relates to a zoom lens and a magnifier utilizing the same and, more particularly, to a low cost and yet quite effective zoom lens and magnifier.

Zoom lenses are relatively complex and costly. Moreover, most are made up of a relatively great number of individual lens elements, thereby providing numerous surfaces which must be traversed by light from an object to be imaged. Since each surface diminishes the amount of light which is transmitted, it will be appreciated that the provision of these numerous surfaces can deleteriously affect the brightness of the final image.

There are many uses for zoom lenses which do not require the complexity which results in diminished brightness and high cost. For example, in some industrial processes it is desirable to provide the zooming function in association with visual checking. Moreover, individuals having some degree of vision loss sometimes need a magnifier which magnifies objects, such as printed pages or packaging labels, in a simple, easily used manner.

SUMMARY OF THE INVENTION

The present invention is a zoom lens and a magnifier utilizing same which is quite low cost and yet is effective for its purposes. While the same only has five lens components or elements, arranged in three groups, it is capable of providing a range of at least 5× magnification.

In its basic aspects, a zoom lens incorporating the invention includes a focusing lens group and a pair of zoom lens groups. The focusing lens group only has one lens element, whereas each of the zoom lens groups has two lens elements and each of the lens groups contributes substantially the same magnification as the other. Motion linkage is connected to the zoom lens groups for moving such monotonically along an optic axis of the arrangement to change the magnification of an image. (By "monotonically" is meant in one direction only without any direction reversals as the group proceeds from one point to another.) This simplifies the design of the motion linkage. Such linkage is adapted to move the zoom lens groups along the axis in such a way so as not to require focusing of the image after operation of such linkage.

A major aspect of the invention is that the various lenses can be, and are in this embodiment, of plastic. That is, they are molded from a material which is primarily made up of a plastic resin selected from the group consisting of polymethylmethacrylate (acrylic), polycarbonate and polystyrene.

Other features and advantages of the invention either will become apparent or will be described in connection with the following, more detailed description of preferred embodiment of the invention.

BRIEF DESCRIPTION OF THE DRAWING

With reference to the accompanying drawing:

FIGS. 5A–7C are graphical representations of corrections for astigmatism and distortion, and transverse ray aberration plots for particular focal lengths.

DETAILED DESCRIPTION OF THE PREFERRED EMBODIMENTS

Figure 1A:
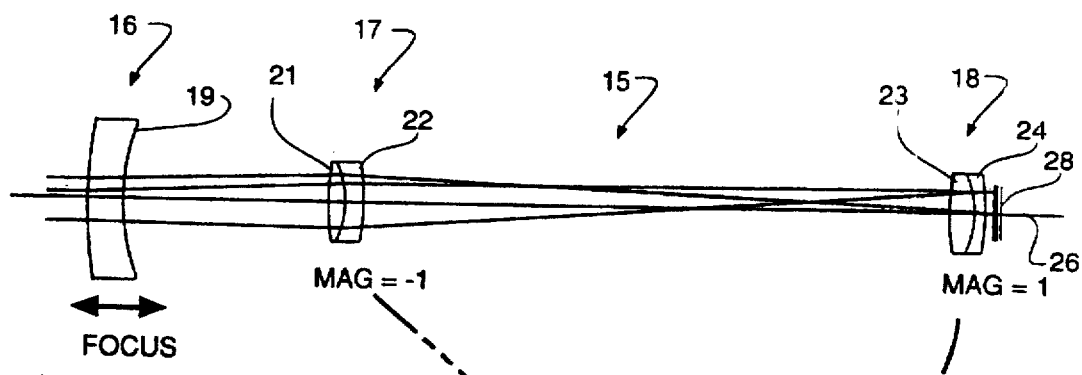
FIG. 1A is an optic line diagram of a preferred embodiment of the lens groups incorporated into a magnifier of the invention with such groups shown in a position providing unity magnification.

The following relatively detailed description is provided to satisfy the patent statutes. It will be appreciated by those skilled in the art, though, that various changes and modifications can be made without departing from the invention.

Schematics of a preferred embodiment of a lens of the invention are generally referred to in the drawings by the reference numeral 15. The zoom lens includes a negative power focusing lens group 16, a variator positive power zoom lens group 17 and a compensator positive power zoom lens group 18. Although in view of older, common parlance the zoom lens group 17 is referred to as a variator and the zoom lens group 18 is referred to as a compensator, it has been found that best results are achieved if these lens groups are designed to share equally in the magnification.

The focusing lens group 16 is made up of only one negative lens, lens 19, whereas the variator 17 and the compensator 18 are both doublets, i.e., made up of two lenses, lenses 21,22 and 23,24 respectively, to correct for chromatic aberrations. One of the lenses of each doublet, e.g., lenses 21 and 23, is positive, whereas the other is negative. Although each doublet is illustrated with the positive lens to the object side of the negative lens, this condition is not a limitation of the patent. The lenses of each doublet are selected so that there is a variation of index with wavelength so that an optical designer can have good focus at several wavelengths. In a specific implementation of the preferred embodiment, acrylic was selected for the positive power lens elements whereas the negative power lens elements were polycarbonate, giving a composite lens of positive power having good color performance. The two lenses of each doublet are cemented together to eliminate two plastic-air interfaces that otherwise would need to be anti-reflection coated. It should be noted that in the specific implementation the negative lens 19 also was of acrylic.

It has been found that in most instances when the invention is implemented the focal lengths of the two lens groups 17 and 18 are basically the same.

Lenses 19–24 are all centrally positioned along an optic axis 26 extending between an object represented at 27 and an image plane represented at 28. A camera charged-coupled pickup device is generally referred to by the reference numeral 29 and is positioned at the image plane to pick up any image formed thereat.

Figure 1B:
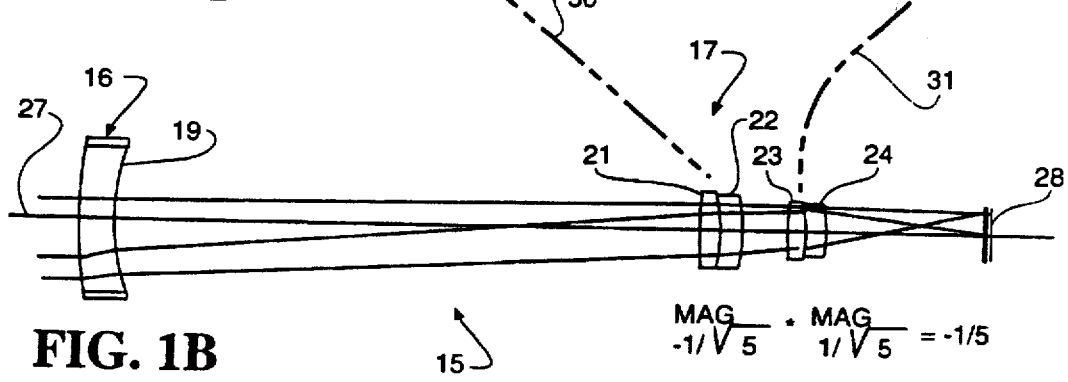
FIG. 1B is a view similar to FIG. 1A illustrating the lens groups positioned to provide minimum magnification.

FIGS. 1A and 1B show the relative motion of the lenses to obtain desired zooming or, in other words, magnification. (A preferred embodiment of motion linkage providing such movement will be described in detail hereinafter.) FIG. 1A illustrates the position of the lens groups when there is unity magnification, i.e., the zoom groups provide no magnification, while FIG. 1B illustrates the lens position when the zoom groups provide 1/5 magnification.

It will be noted from a comparison of FIGS. 1A and 1B that the focus lens group 16 has the same position for both no and maximum magnification. There is no need that it be moved when the magnification is changed. That is, it cooperates with the positive power lenses at all of the latters' positions to maintain focus of the image at the image plane.

The above and the desired magnification are obtained by selecting the zoom lens groups 17 and 18 to give generally the same magnification, i.e., so that they equally share in the magnification. It is also important that these groups be moved in a particular fashion relative to one another and relative to both the focus lens group 16 and the image plane 28. While the motion of the two lens groups 17 and 18 is compound, it is monotonic. That is, each group is moved only in one direction and such direction remains unchanged throughout the range of the group's movement. The simplest way of achieving such motion is to move one lens in a linear fashion and the other on a non-linear path to provide the desired magnification/focusing. In this preferred embodiment, it is the variator 17 which is moved linearly and the compensator 18 which is moved non-linearly. It will be recognized by those skilled in the art, though, that it could equally as well be vice-versa, i.e., the compensator moved linearly and the variator moved non-linearly.

Figure 2:
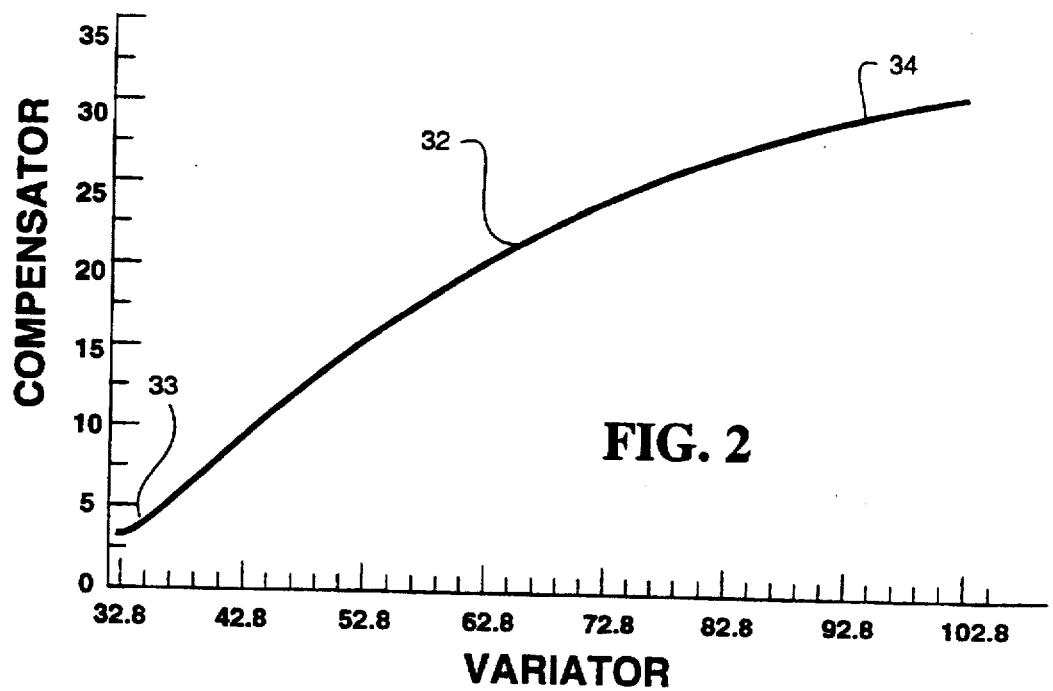
FIG. 2 is a graphical representation of the relationship of the positions of lens groups relative to one another in the preferred embodiment of FIG. 1.

The linear motion of variator 17 is represented by straight phantom line 30 extending between FIGS. 1A and 1B, whereas the corresponding non-linear motion for compensator 18 is represented by non-linear phantom line 31. Graph line 32 in FIG. 2 provides a graphical representation of the positions of the two zoom lens groups relative to one another at all magnifications between the two extremes. The "compensator" scale shows the distance from the compensator 18 to the image plane 28, whereas the variator scale shows the distance from the variator to the focusing lens. Two other important parameters are the separation between the compensator and the variator and the distance from the object to the focusing lens. In operation, however, the position of the focusing lens and the pickup device are fixed at values that satisfy the mathematics set forth below, so the variator versus compensator curve is sufficient to describe the motion. The position for unity magnification is represented at 33 and the position for minimum magnification is represented at 34.

Figure 3:
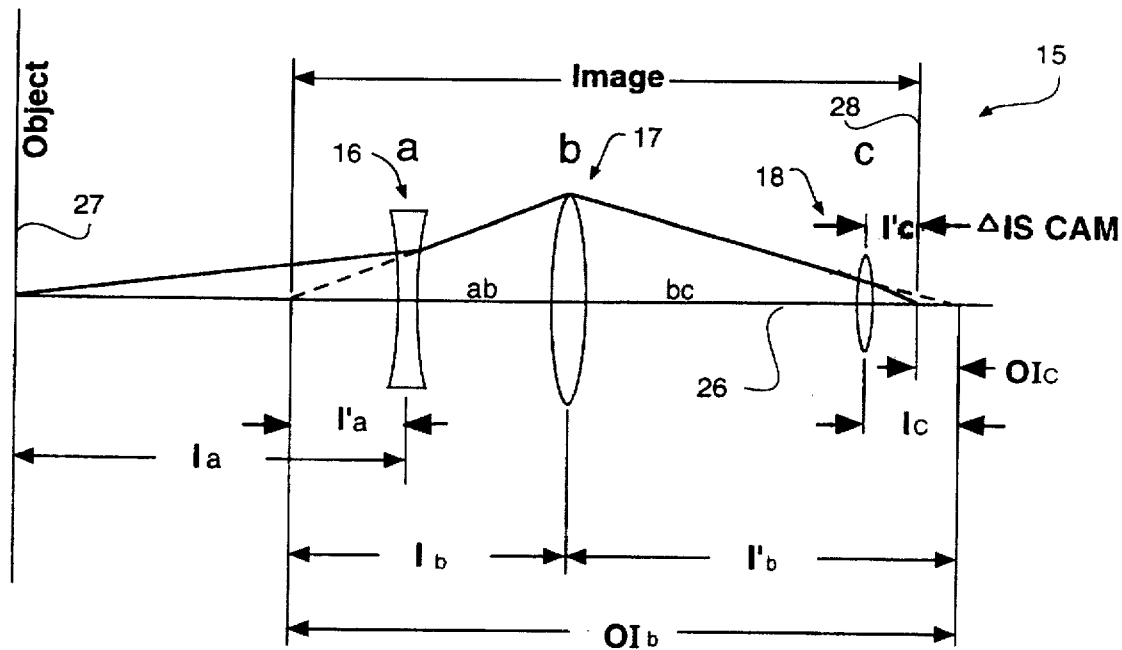
FIG. 3 is another line diagram illustrating various distance relationships.

FIG. 3 shows the lens groups reduced to single thin lenses with their associated parameters, to allow calculation of the zoom lens motions and total magnification. In FIG. 3:

$1_a$=object distance for lens a
$1'_a$=image distance for lens a
$1_b$=object distance for lens b
$1'_b$=image distance for lens b
$1_c$=object distance for lens c
$1'_c$=image distance for lens c
ab=separation between lenses a and b
bc=separation between lenses b and c
$OI_b$=object to image distance for lens b
$OI_c$=object to image distance for lens c Denoting the following:

$f_a$=focal length lens a
$f_b$=focal length lens b
$f_c$=focal length lens c
$m'_a$=magnification for lens a
$m'_b$=magnification for lens b
$m'_c$=magnification for lens c
$m'_z$=magnification for lens b and lens c together
$m'_T$=magnification for total zoom lens
image=distance of final image plane from object lens b Then:

Equation 1: $1'_a = (1/f_a - 1/1_a)^{-1}$

Equation 2: $ab_i = 2f_b - 1'_a$ (initial separation of lenses a and b)

Equation 3: $m'_a = -1'_a/1_a$

Equation 4: $1_b = ab - 1'_a$

Equation 5: $m'_b = -(1_b/f_b - 1)^{-1}$

Equation 6: $1'_b = f_b(1 - m'_b)$

Equation 7: $OI_b = 1_b + 1'_b$

Equation 8: $OI_c = OI_b$-image

Equation 9: $m'_c = OI_c/2f_c + 1 - [(OI_c/f_c)^2/4 + OI_c/f_c]^{1/2}$

Equation 10: $1'_c = (1 - m'_c) * f_c$

Equation 11: $1_c = (1 - 1/m'_c) * f_c$

Equation 12: $bc = 1'_b + 1_c$

Equation 13: $m'_z = m'_b * m'_c$

Equation 14: $m'_T = m'_a * m'_b * m'_c$

The magnification may be changed by changing the value of parameter ab while simultaneously satisfying the above set of equations. If only the positions of lens b and lens c are allowed to vary, the equation constraints determine the motions of each lens and the resulting magnification. The variation in $1'_c$ (Equation 10) as a function of the variation in the parameter ab determines the cam profile. Equation 13 gives the magnification produced by the combination of lens b and lens c, and Equation 14 gives the total zoom lens magnification.

Figure 4:
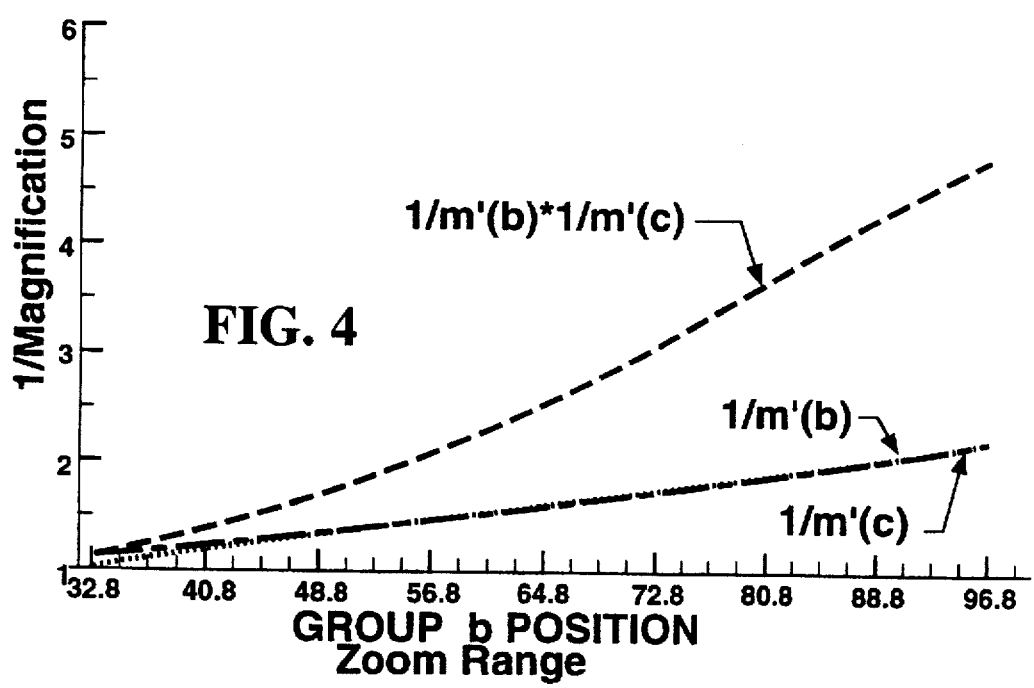
FIG. 4 is a graphical representation of the magnification provided by the lenses incorporated into the preferred embodiment.

Reasonable starting values for the above equations are as follows:

$1_a = 215.73$
$f_a = -110.125$
$f_b = 52.85$
$f_c = 54.04$
image=211.2
$ab_i = 32.8$ Application of the equations generates the cam curve of FIG. 2 and the zoom range of FIG. 4. As is shown in FIG. 4, the magnification provided by lenses 17 and 18 changes in the same direction throughout the lens' range of relative movement.

An implementation of the zoom lens of the invention, using elements of finite thickness, is as follows:

Denote the following:

Lens a has two surfaces numbered 1 and 2
Lens b has three surfaces numbered 3, 4, and 5
Lens c has three surfaces numbered 6, 7, and 8
Then Rs represents the radius of surface s Ds represents the distance from surface s to surface (s+1)

Ns represents the index of refraction of the optical medium following surface s (if not shown, index is 1.00 for air)

Vs represents the Abbe number, the reciprocal of the relative dispersion of the optical medium following surface s (if not shown, medium is air)

Note that the lens separations, D2, D5, and D8 represent air spaces of variable size correspond to dimensions ab, bc, and $l'_c$ in FIG. 3 and the equations.

The table below illustrates values that produce a zoom lens having a focal length, F, ranging from 16 to 104 units, a Relative Aperture or f/number, Fno, ranging from 3.4 to 10.3, and a field of view, Z, ranging from 25° to 5°.

| F = 16–104 | Fno = 3.4–10.3 | Z = 25°–5° | |
|---|---|---|---|
| R1 = 56.456 | D1 = 4.20 | N1 = 1.491 | V1 = 57.2 |
| R2 = 26.585 | D2 = Variable | | |
| R3 = 50.703 | D3 = 2.147 | N2 = 1.491 | V2 = 57.2 |
| R4 = –18.525 | D4 = 2.466 | N3 = 1.590 | V3 = 30.8 |
| R5 = –41.458 | D5 = Variable | | |
| R6 = 33.500 | D6 = 3.721 | N4 = 1.491 | V4 = 57.2 |
| R7 = –12.934 | D7 = 1.216 | N5 = 1.590 | V5 = 30.8 |
| R8 = –40.556 | D8 = Variable | | |

| Focal Length | D2 | D5 | D8 |
|---|---|---|---|
| 16.06 | 104.935 | 10.111 | 25.170 |
| 36.04 | 65.557 | 59.425 | 15.253 |
| 103.62 | 36.320 | 101.549 | 2.290 |

Figure 5C:
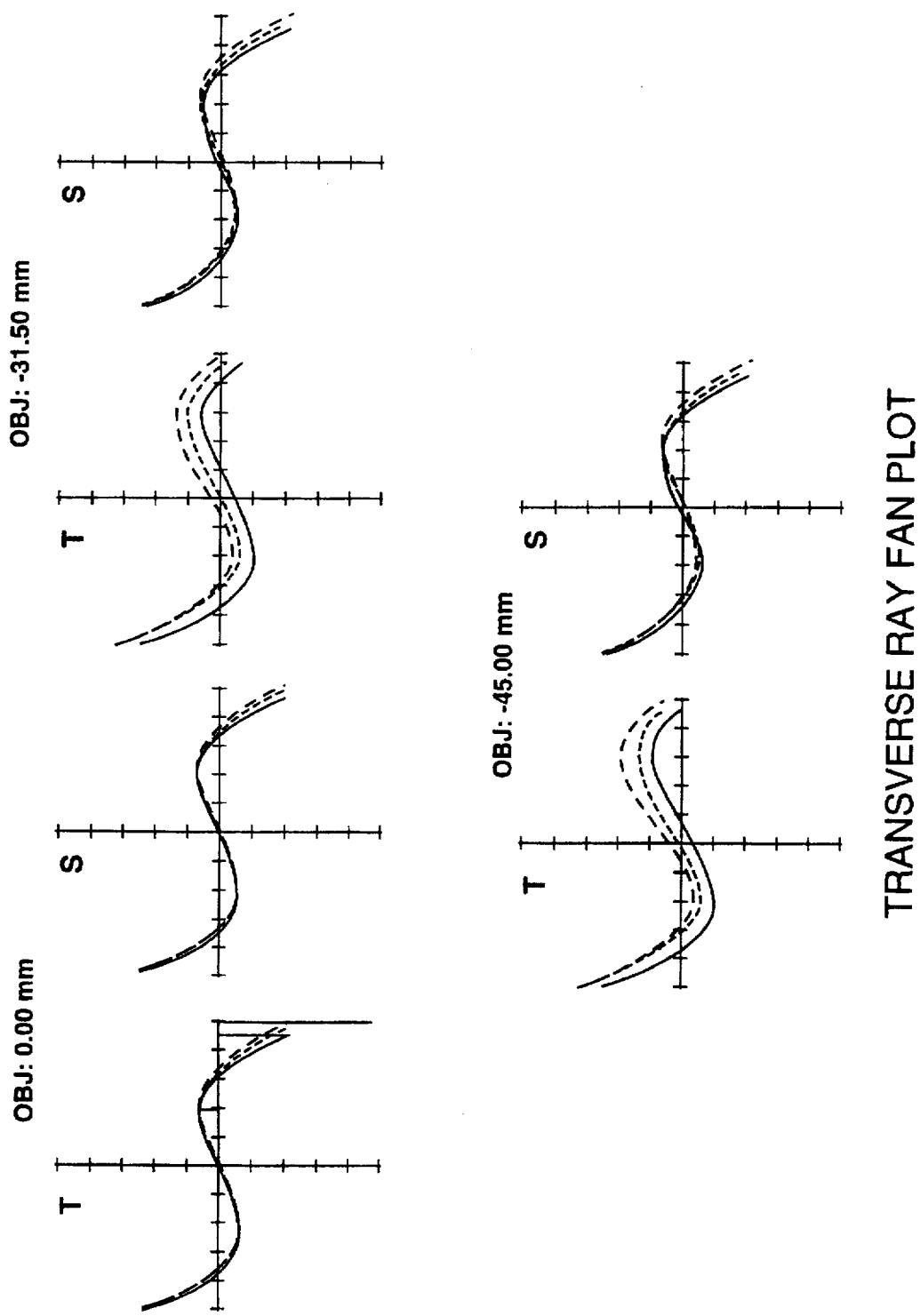
Figure 7B:
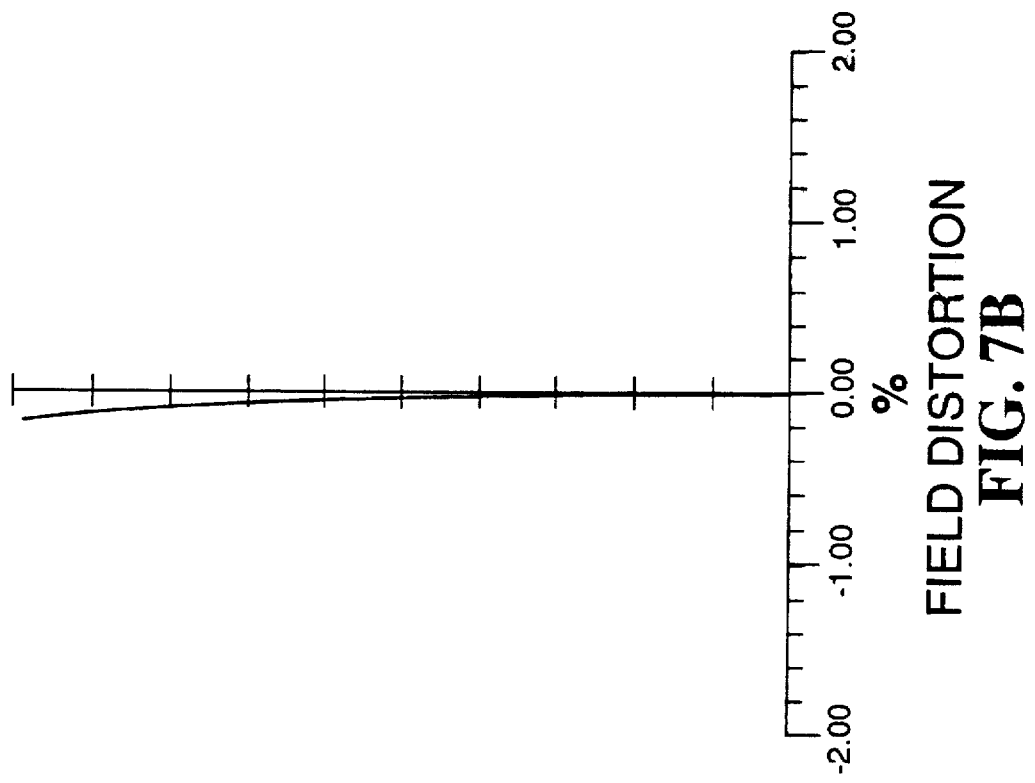
Figure 7A:
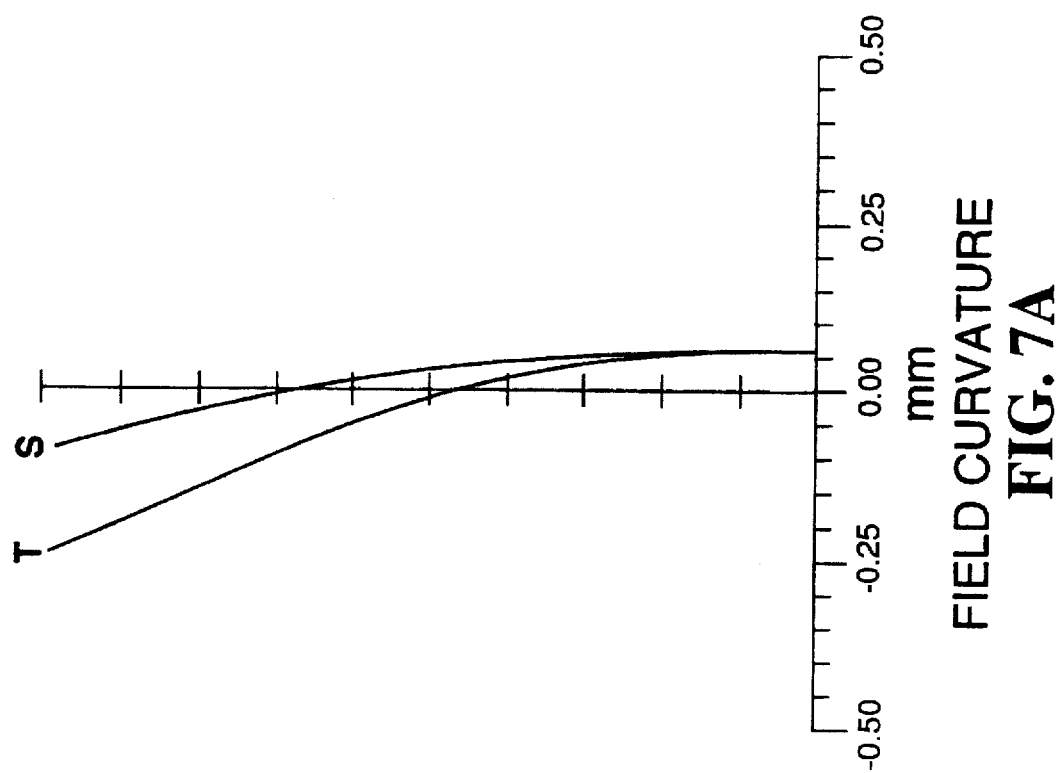
Figure 7C:
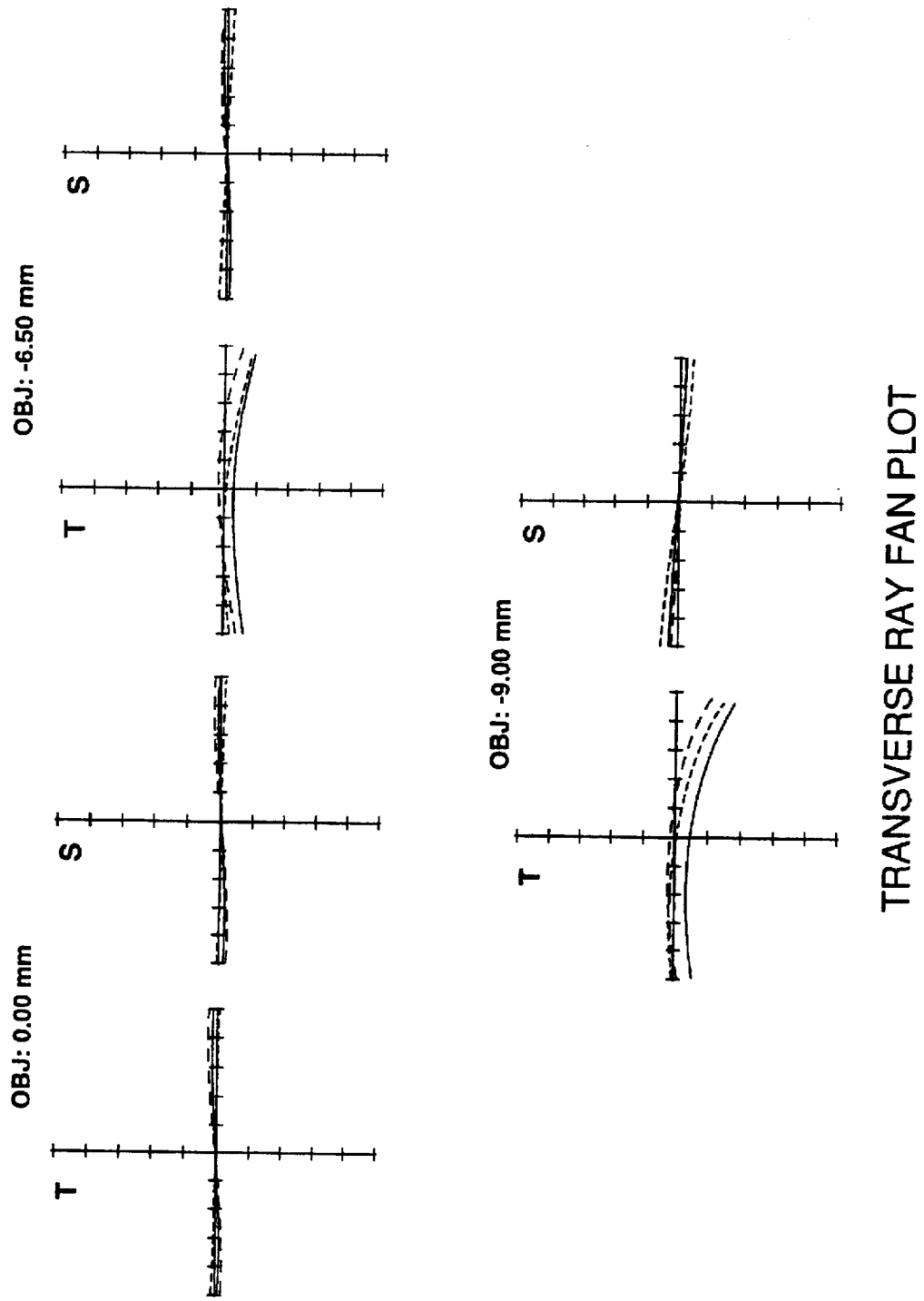
Figure 8:
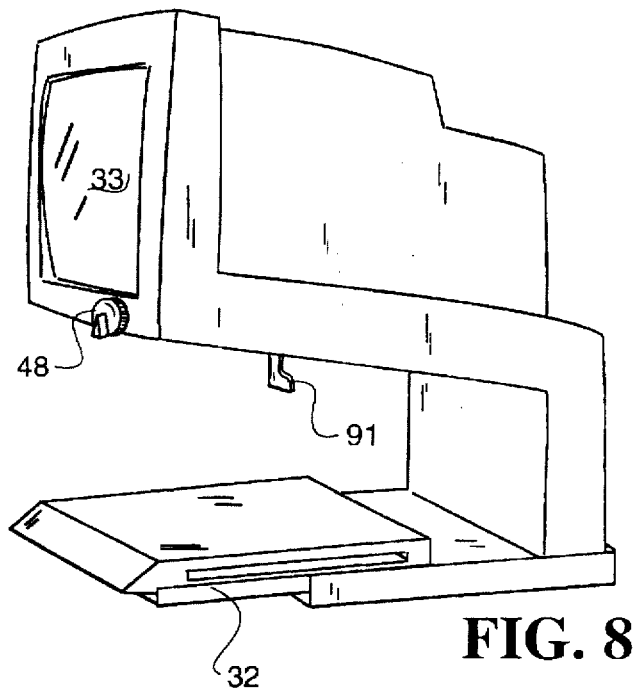
FIG. 8 is an isometric illustration of a magnifier incorporating the invention.
Figure 9:
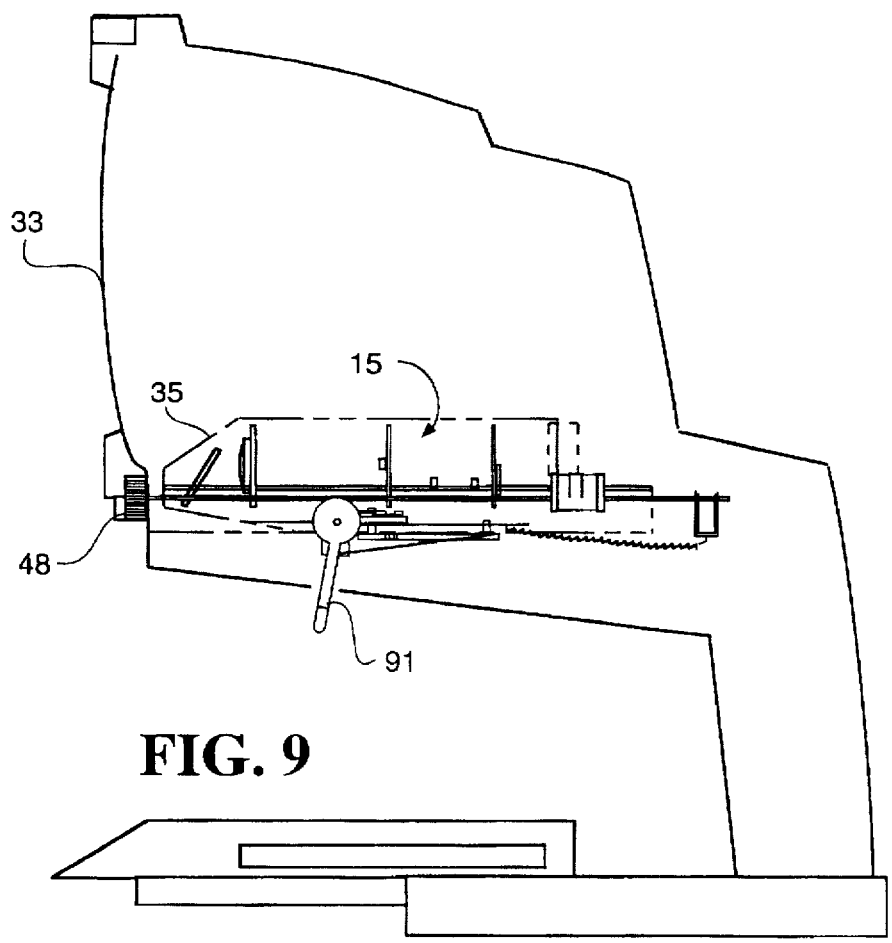
FIG. 9 is a side elevation view of the magnifier of FIG. 8.
Figure 10:
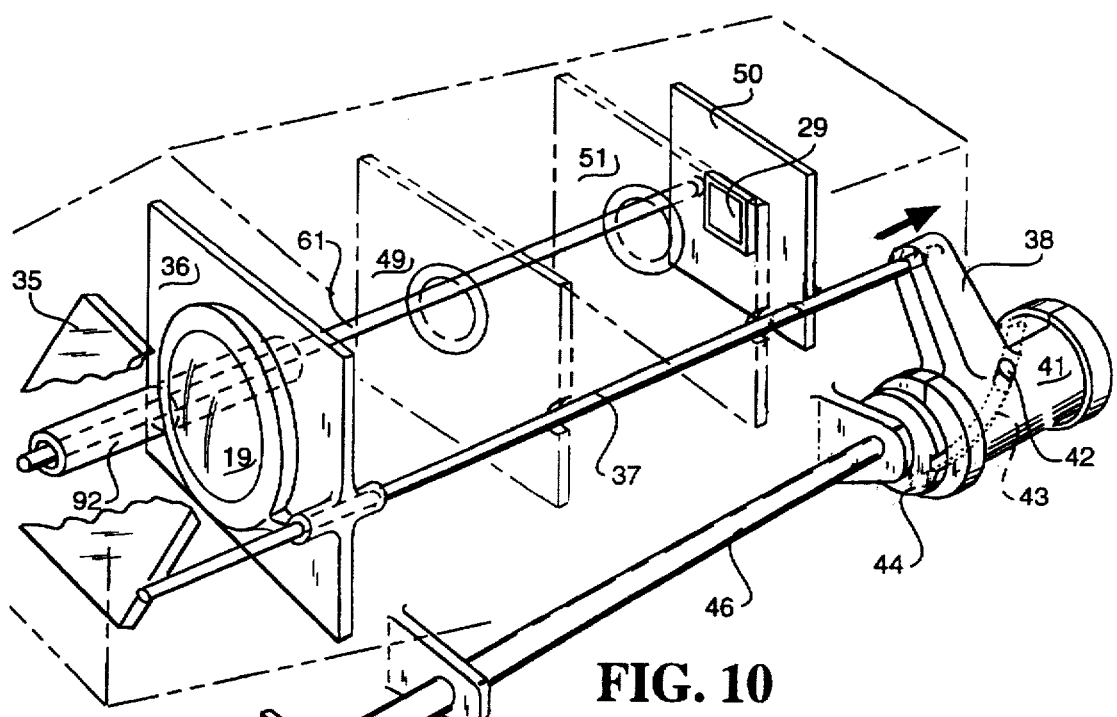
FIG. 10 is a partial isometric and schematic view of aspects of the zoom lens incorporated into the magnifier.

The correction of astigmatism and distortion for the 16.06 focal length is as shown in FIGS. 5A and 5B. The transverse ray aberration plot is shown in FIG. 5C. FIGS. 6A–6C are the corresponding plots for the 36.04 focal length and FIGS. 7A–7C for the 103.62 focal length.

As can be seen from the above, a zoom lens incorporating the invention is quite simple in that it includes only five actual lens elements, and only two lens groups have to be moved to provide 5× zooming. FIGS. 8–15 illustrate a magnifier incorporating the zoom lens. Such magnifier includes a support 32 for an object to be viewed, the zoom lens arrangement 15 (see FIG. 9), and a display monitor 33.

Reference is made to FIGS. 10–14 for an understanding of the specific implementation of the zoom lens in the magnifier of the invention. An optics module is provided having an optics base 34. A mirror 35 is positioned to gather light from an object on the support 32 and direct it through the lens groups of the zoom lens. The first lens group is a focusing lens and as discussed before, is made up of only one element, lens 19. Lens 19 is positioned and held within a focus lens holder 36 (FIG. 10) in a manner to be discussed hereinafter. Holder 36 is, in turn, fixed on a push rod 37 which is incorporated within the optics module to move linearly only. As illustrated, the far end of push rod 37 is press fit or otherwise secured within an arm 38 projecting from a focus cam sleeve 41. Sleeve 41 has an inwardly directed pin 42 which rides within a spiral slot 43 on the surface of a cylindrical focusing cam 44. Such cam is, in turn, axially connected to a focusing shaft 46 which extends outwardly of the front panel 47 of the magnifier bezel to terminate in a focusing knob 48. Guide tube 92 provides a sliding support for holder 36 without disturbing the position of guide rod 61, described later.

Cam sleeve 41 is held by suitable structure (not shown) to only move linearly, i.e., back and forth, upon rotation of cam 44 on its axis. When it moves, the push rod 37, in turn, moves the focusing lens holder 36 and, hence, the focusing lens 19 back and forth along the optic axis 26. Thus, it is only necessary for the user of the magnifier to rotate knob 48 in the appropriate direction to move the focusing lens linearly to obtain the desired focusing of the image at the camera pickup device 29. Such pickup device is mounted on a camera printed circuit board 50. Focusing can be monitored and corrected by checking the display on the monitor 33.

As mentioned previously, the two zoom lens groups are movable between the focusing lens and the camera pickup device. These groups are also held on the optic axis by holders similar to holder 36. Such holders, 49 and 51, respectively, are represented in phantom in FIG. 10.

Figure 11:
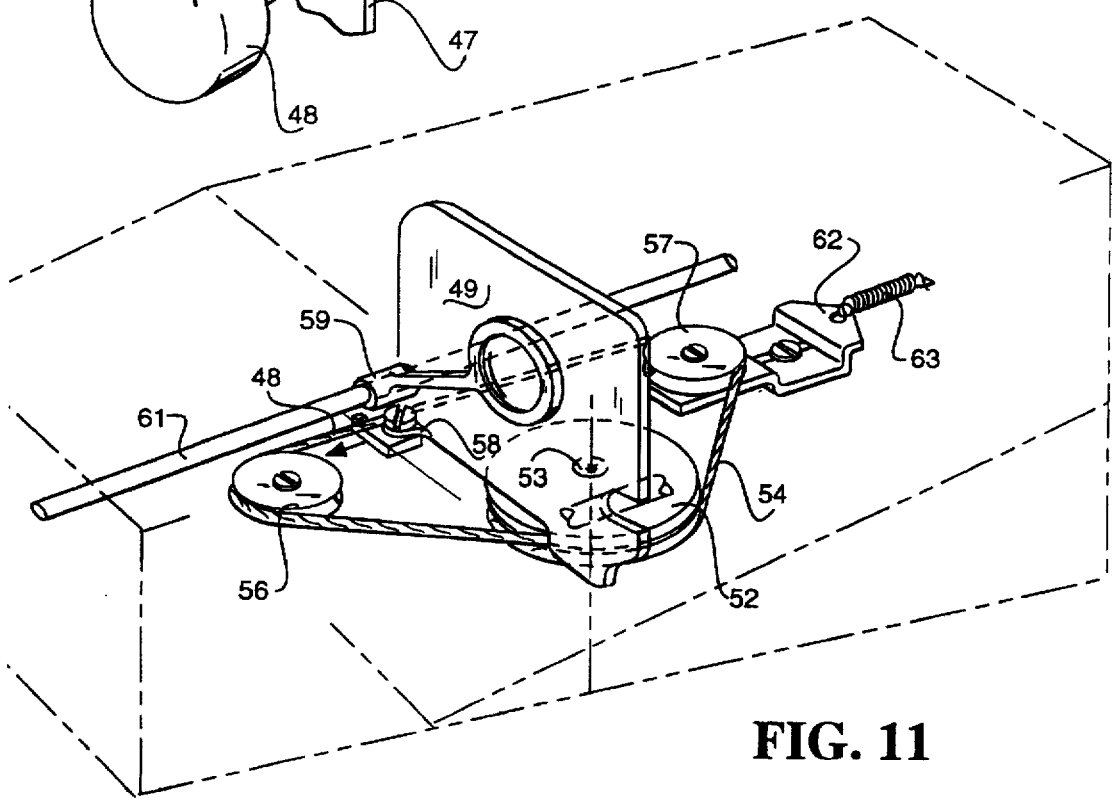
FIG. 11 is a view similar to that of FIG. 10 illustrating other aspects of the zoom lens incorporated into the magnifier.
Figure 13:
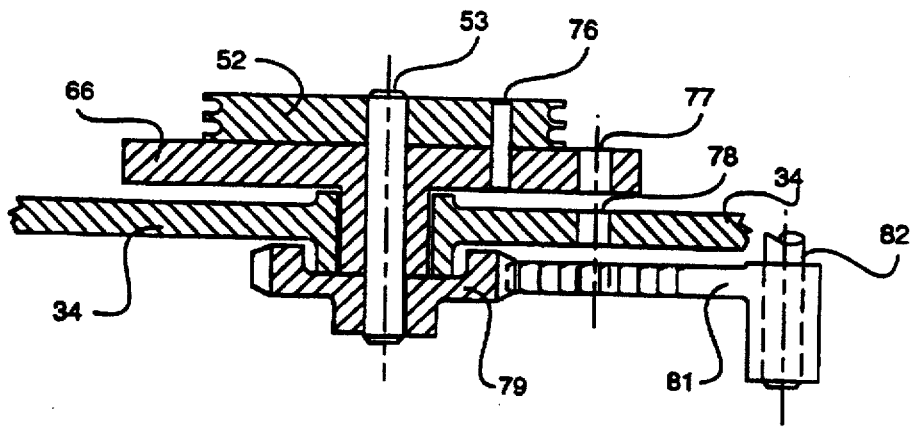
FIG. 13 is an enlarged sectional view illustrating the zoom drive of the magnifier.
Figure 14:
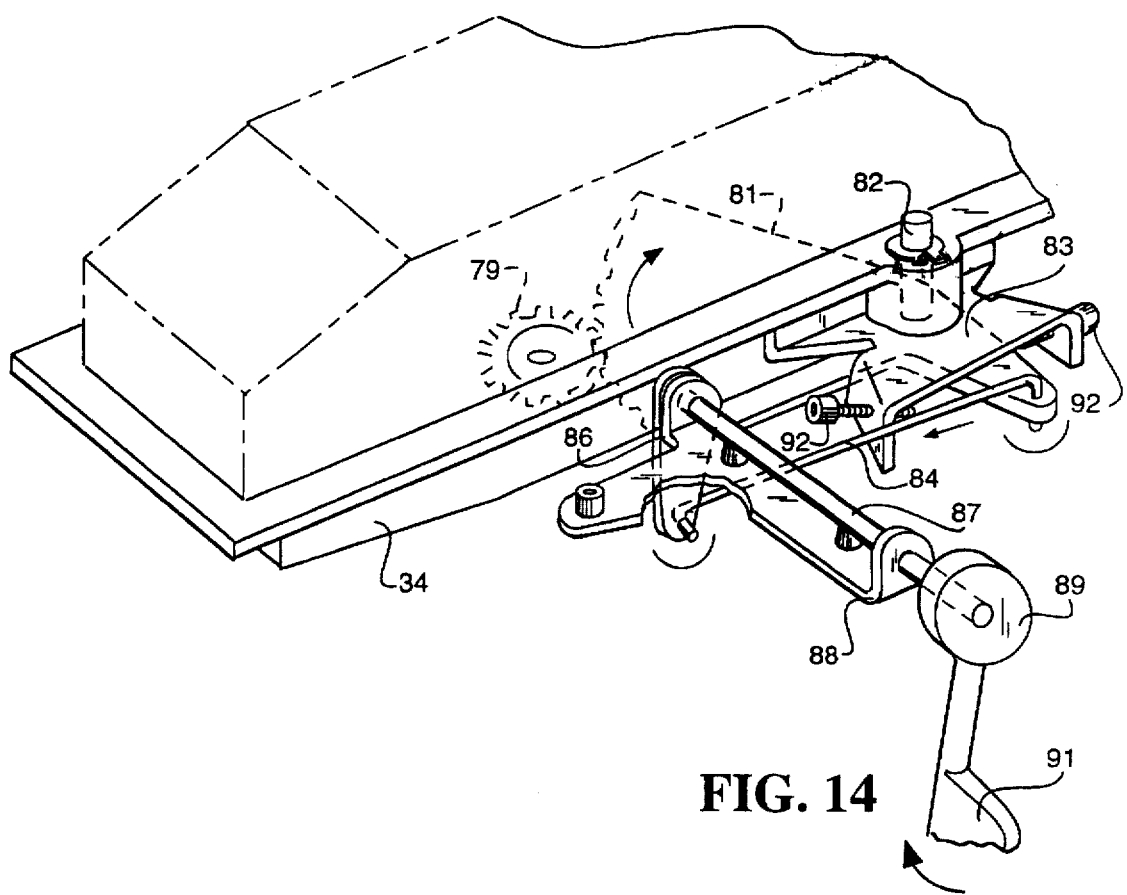
FIG. 14 is an isometric view which illustrates the zoom drive control of the magnifier.

The drive for holder 49 and hence the variator zoom lens group is shown in some detail in FIG. 11. As mentioned previously, the movement of such lens group is linear. A drive pulley 52 is mounted for axial rotation on a gear shaft 53 (FIG. 13). A pre-stressed cable 54 extends about the drive pulley 52 in a closed path defined by such pulley and a pair of idler pulleys 56 and 57. The cable ends are anchored to the drive pulley. The holder 49 is clamped to the cable as indicated at 58 for movement therewith linearly between the idler pulleys. Holder 49 is fixed to sliding guide rod 61 which is parallel to the optic axis 19 and thereby defines the motion of the lens group 17 along such axis. As is illustrated, idler pulley 57 is mounted on a movable cable tensioner 62 which, via a tension spring 63, maintains cable 54 taut.

It will be seen from the above that rotation of the drive pulley by the shaft 53 will result in consequent linear movement of the holder 49, the distance of travel of the same being directly related to the degree of rotation and the diameter of the drive pulley 52.

Figure 12:
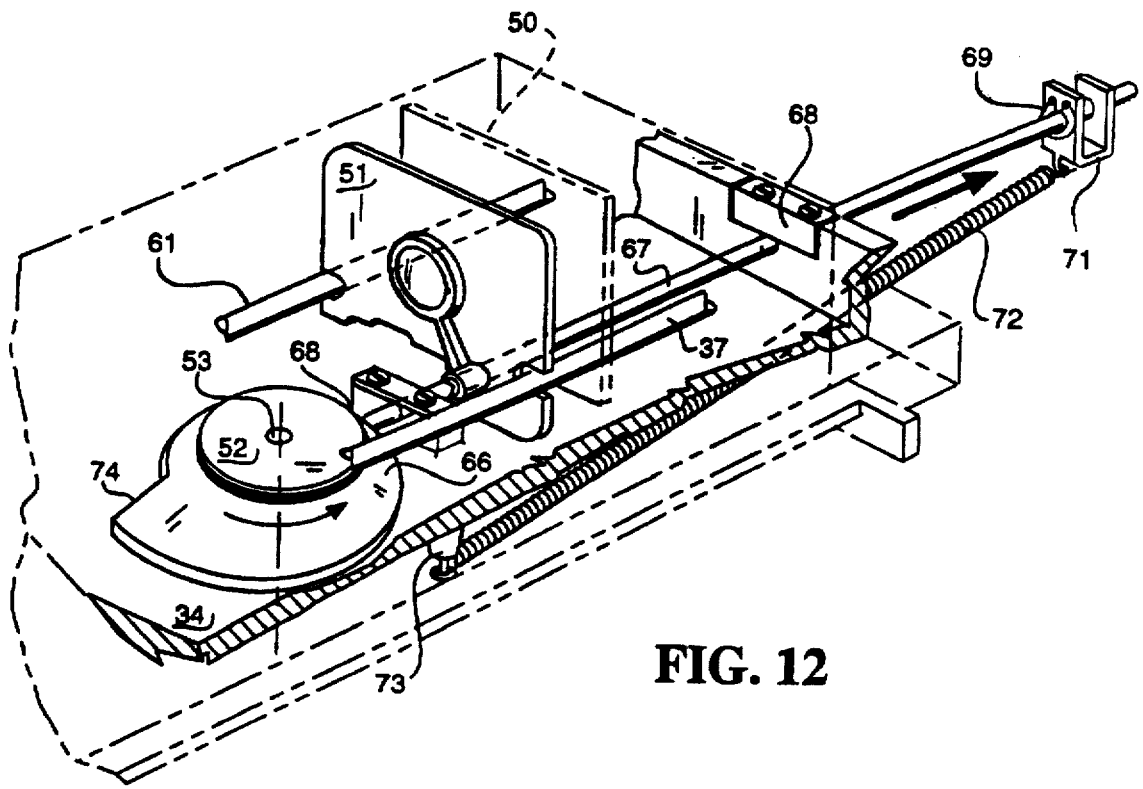
FIG. 12 also is a view similar to that of FIG. 10 illustrating additional aspects of the zoom lens.

The drive for lens holder 51 for the compensator lens group is illustrated in FIG. 12. Its movement is defined by a cam 66 which is axially mounted along with cable drive pulley 52 on zoom gear shaft 53. Its surface is engaged by an end of a follower rod 67 which is held for back and forth linear motion, by bearings represented at 68. Holder 51 is secured to rod 67 and moves with it. Rod 67 includes a restraining ring 69 at its free end which engages a spring hanger 71. Such spring hanger and, hence, rod 67 is resiliently urged in the direction of the cam follower by a return spring 72 maintained in tension between the hanger 71 and an anchor 73 on the optics base 34.

As mentioned previously, while the variator lens group is moved monotonically linearly, the compensator lens group held by holder 51 is moved non-linearly monotonically. It will be seen from the previous discussion that the path of compensator lens movement is defined by the surface of the cam 66 which in turn conforms to graphline 32 in FIG. 2. Because the drive arrangement as will be discussed does not require a full 360° rotation of the cam to provide the desired movement, the cam can include a major discontinuity as indicated at 74.

Motion linkage is connected to the holders for moving the same in the desired fashion along the optic axis. Such motion linkage includes a gearing arrangement for both the cam 66 and the cable drive pulley 52, illustrated in section in FIG. 13. Both the cam and the pulley are maintained together for rotation on shaft 53 by pin 76. Thus, the lens holders 49 and 51 and the zoom lens groups associated with each are tied together for concurrent movement. As is shown, an alignment hole 77 extends through the cam 66. Such hole is axially aligned with a registerable hole 78 in the optics base during assembly.

A zoom drive gear 79 is also axially connected to the shaft 53, outside of the optics base 34. It is engaged by a lever drive gear 81 which is mounted for rotation on a shaft 82. Lever gear 81 has an arm 83 (FIG. 14) which is engaged by a rod 84 that is, in turn, connected to one end of a radial lever bar 86. Such bar, in turn, is permanently connected to a zoom shaft 87 which is suitably mounted as by a bracket 88 for rotation about its axis and, hence, radial rotation of bar 86. The free end of shaft 87 is connected to a zoom lever 89 which has a graspable flange 91 to facilitate its rotation by a user.

It will be seen from the above that a user of the magnifier can simply provide the zoom function by rotating lever 89. Movement by the user of the graspable flange 91 toward the front of the magnifier will increase magnification, whereas movement away from the front will decrease such magnification. A pair of adjustable zoom stop screws 92 for engagement with the lever gear arm 83 are provided to prevent motion of the motion linkage beyond the desired range.

As mentioned at the beginning of the detailed description, applicants are not limited to the specific embodiment described above. Various changes and modifications can be made. Such specific embodiment is exemplary rather than exhaustive. The claims, their equivalents and their equivalent language define the scope of protection.

What is claimed is:

1. A magnifier for enhancing the visual projection of an object comprising, in combination:

(A) a support for an object to be magnified;
   (B) a focusing lens group positioned on an optic axis to gather light from an object at said support;
   (C) a focus control manipulatable by an operator of said magnifier and connected to said focusing lens group for moving the latter on said optic axis to focus an image of said object at an image plane;
   (D) a pair of zoom lens groups positioned on said optic axis between said focusing lens group and said image plane;
   (E) motion linkage connected to said zoom lens groups for moving the latter along said axis relative to one another between said focusing lens group and said image plane to change the magnification of said image of said object at said image plane;
   (F) a zoom control manipulatable by an operator of said magnifier, connected to said motion linkage to enable manipulation of said zoom lens groups by said operator to obtain a desired magnification;
   (G) an image pickup device positioned at said image plane to receive said image of said object;
   (H) an electrically operable monitor in communication with said pickup device adapted to display an enlarged view of said image of said object;
   (I) said motion linkage being connected to said zoom lens groups to move the same along said axis in a range between said focusing lens group and said image plane so as not to require movement of said focusing lens group to focus said image at said image plane after operation of said motion linkage: and
   (J) the magnification of each of said zoom lens groups being generally of the same positive power as that of the other, and said focusing lens group consisting of one negative focusing lens and each of said positive power zoom lens groups consisting of two lenses.

2. The magnifier of claim 1 wherein the focal length of each of said zoom lens groups is generally the same as the focal length of the other.

3. The magnifier of claim 1 wherein said motion linkage connected to said pair of zoom lens groups is adapted to move said groups relative to one another and relative to said focusing lens and image plane to change the magnification over a range of from unity to ⅕.

4. The magnifier of claim 1 wherein said lens groups consist of individual lens elements, at least one of which is plastic.

5. The magnifier of claim 4 wherein each of said individual lens elements is a plastic lens consisting primarily of a plastic resin selected from the group consisting of polymethylmethacrylate, polycarbonate and polystyrene.

6. A magnifier according to claim 1 further including as part of said combination, a mirror positioned between said support and said focusing lens group to direct light defining the object to said focusing lens group.

7. The magnifier of claim 1 wherein said zoom lens groups are grouped together for concurrent movement.

* * * * *